Figure 1:
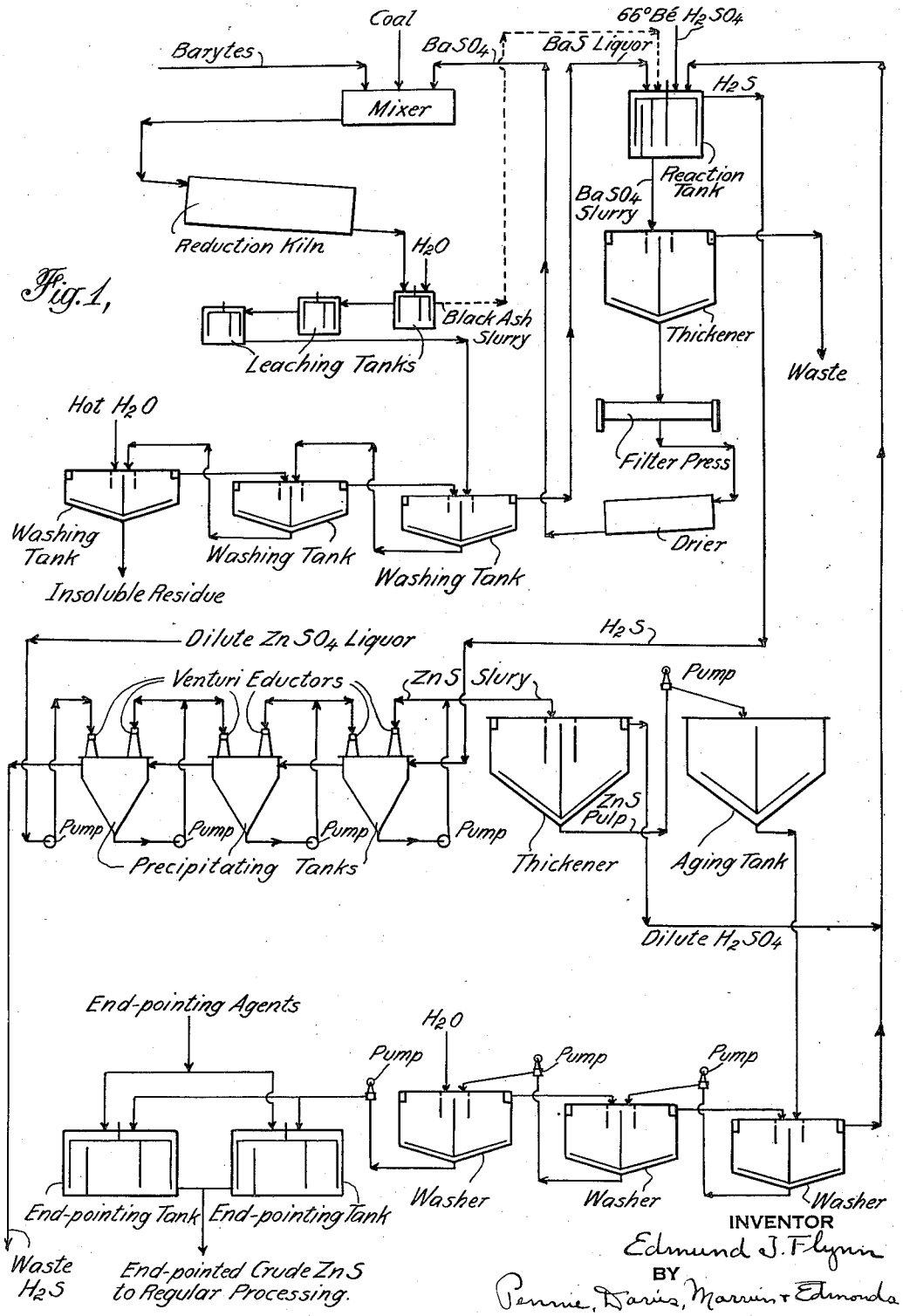

Aug. 4, 1936.  E. J. FLYNN  2,049,646
ZINC SULPHIDE
Filed Jan. 24, 1935  2 Sheets-Sheet 2

INVENTOR
Edmund J. Flynn
BY
Pennie, Davis, Marvin + Edmonds
ATTORNEYS

UNITED STATES PATENT OFFICE 2,049,646

ZINC SULPHIDE

Edmund J. Flynn, Palmerton, Pa., assignor to
The New Jersey Zinc Company, New York,
N. Y., a corporation of New Jersey Application January 24, 1935, Serial No. 3,310

7 Claims. (Cl. 23—135)

This invention relates to the manufacture of zinc sulphide pigment by the reaction of hydrogen sulphide with an aqueous solution of zinc sulphate, and has for its object the provision of an improved method of producing hydrogen sulphide for the reaction.

Hydrogen sulphide reacts with a dilute aqueous solution of zinc sulphate to form a precipitate of zinc sulphide and dilute sulphuric acid as indicated by the following equation:

$$ZnSO_4 + H_2S = ZnS + H_2SO_4$$

In accordance with the present invention, hydrogen sulphide gas for the foregoing reaction is produced by the reaction of the dilute sulphuric acid with barium sulphide:

$$BaS + H_2SO_4 = BaSO_4 + H_2S$$

When barium sulphide dissolves in water, barium hydrate and barium sulphhydrate are formed by hydrolysis, so that the reaction of barium sulphide liquor with dilute sulphuric acid may be represented as follows:

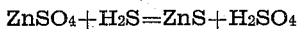
$$Ba(OH)(SH) + H_2SO_4 = BaSO_4 + H_2O + H_2S$$

The present invention thus contemplates a cyclic method of producing the hydrogen sulphide gas required in the precipitation of zinc sulphide. The sulphuric acid produced in the precipitation is recovered by utilizing it to form fresh hydrogen sulphide by reaction with barium sulphide liquor or barium sulphide. Since the recoveries secured in the contemplated reactions are very high, the operation is nearly self-sustaining with respect to the production of hydrogen sulphide.

The invention further contemplates utilization of the barium sulphate produced by the reaction of dilute sulphuric acid with barium sulphide liquor or barium sulphide. The barium sulphate thus obtained can be regenerated to barium sulphide by reduction with carbon and heat by the known methods to form barium sulphide:

$$BaSO_4 + 2C = BaS + 2CO_2$$

and barium sulphide liquor prepared if desired from the barium sulphide thus produced by leaching with water according to the known methods:

$$BaS + H_2O = Ba(SH)(OH);$$

or, the barium sulphate obtained by the reaction of sulphuric acid with barium sulphide liquor may be utilized as pigment (blanc fixe).

The invention is particularly adapted for use in connection with the processes of precipitating zinc sulphide by the reaction of hydrogen sulphide with zinc sulphate solution disclosed in the copending application for Letters Patent of the United States, Ser. No. 702,578 and Ser. No. 702,580 filed Dec. 15, 1933, by Arne J. Myhren and Byron Marquis now Pat. No. 2,020,325 and 2,020,902. The apparatus disclosed in the copending U. S. application, Ser. No. 702,579 filed December 15, 1933 by A. J. Myhren and Byron Marquis may also be used in the step of precipitating zinc sulphide by the reaction of hydrogen sulphide and zinc sulphate solution in the combination with the present method. The present invention may likewise be used in producing the hydrogen sulphide gas required for the treatment of zinc sulphate solution in the method of producing high strength lithopone disclosed in the copending United States application, Serial No. 731,821 filed June 22, 1934 by Leon S. Holstein.

Figure 2:
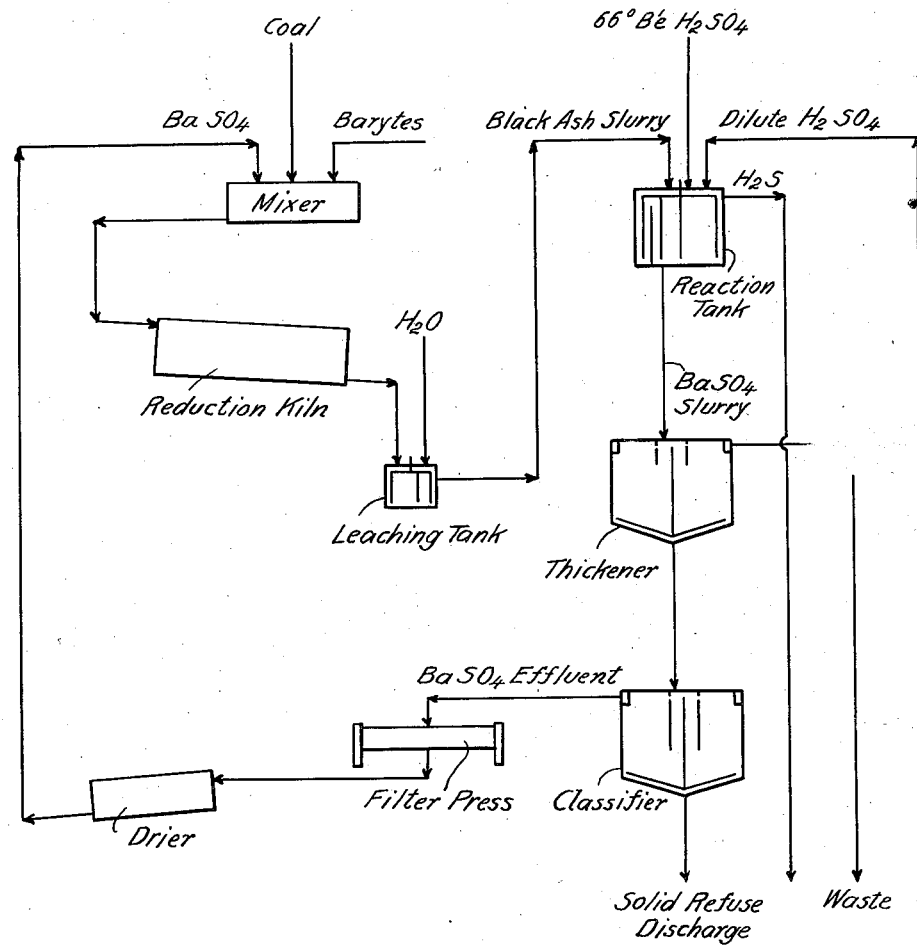

The invention will be better understood from the following description taken in conjunction with the accompanying drawings, in which Fig. 1 is a diagrammatic flow sheet of a zinc sulphide precipitating plant embodying the invention, and Fig. 2 is a diagrammatic flow sheet showing a modified practice of the invention for producing hydrogen sulphide for use in the zinc sulphide plant.

Referring to Fig. 1 of the drawings, the zinc sulphide precipitating tanks are arranged in series with cooperating Venturi tube eductors as described in the aforementioned patent application, Serial No. 702,579. Dilute and purified zinc sulphate solution from any appropriate source is introduced into one end of the system of three precipitating tanks. Hydrogen sulphide gas is introduced at any appropriate point of the system of three tanks, as for example, at the other end of the system from which the zinc sulphate solution is introduced. Dilute sulphuric acid, resulting from the reaction of the hydrogen sulphide gas and zinc sulphate solution, is present in the slurry discharged from the precipitating system into a thickener. The overflow from the thickener consists of dilute sulphuric acid, which is conducted to a reaction tank where it enters into reaction with barium sulphide liquor to form barium sulphate and hydrogen sulphide.

The zinc sulphide pulp removed from the bottom of the aforementioned thickener is pumped to an aging tank. From the aging tank the slurry is conducted through a system of three washers, where the slurry is washed in countercurrent with water to remove the sulphuric acid still present. The dilute sulphuric acid discharged from the washing system is sent to the reaction tank in conjunction with the overflow acid from the aforementioned thickener. From the washing system, the slurry of zinc sulphide is pumped to end-pointing tanks, where it is treated with appropriate neutralizing agents such as calcium hydroxide and sodium hydroxide to remove the acid present therein and likewise with appropriate agents such as zinc oxide to condition it for the subsequent calcining treatment. After end-pointing, the crude slurry is subjected to regular processing operations for pigment production, such, for example, as filter-pressing, drying, calcination, quenching in water, wet grinding, filter-pressing, drying and disintegration.

The hydrogen sulphide evolved from the reaction of the dilute sulphuric acid with barium sulphide liquor is conveyed to the zinc sulphide precipitating system, where it reacts with the dilute zinc sulphate solution as hereinbefore described.

The barium sulphate slurry, from the reaction of the dilute sulphuric acid and the barium sulphide liquor, is discharged into a thickener. The overflow from the thickener is sent to waste, and the thickened underflow of barium sulphate pulp is transferred to a filter press. The filter cake from the press is transferred to a dryer. The dry barium sulphate is mixed with coal in an appropriate mixer, and crude barytes is added to the mixer in sufficient amount to compensate for losses in the system. The mixture of coal, precipitated barium sulphate and barytes is heated, in an appropriate reduction kiln, to effect the reduction of barium sulphate to barium sulphide:

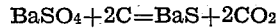
$$BaSO_4 + 2C = BaS + 2CO_2$$

The resulting reduction product is transferred to a system of three leaching tanks where the barium sulphide content is dissolved in water:

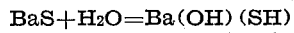
$$BaS + H_2O = Ba(OH)(SH)$$

Further recovery of barium sulphide is effected by washing the solid residue from the leaching tanks with hot water in a series of three washing tanks. The final insoluble residue of the barium sulphide reduction product is discharged from the last of the washing tanks. The barium sulphide liquor obtained from the leaching and washing tanks overflows from the first of the washing tanks and is conveyed to the reaction tank where it enters into reaction with the dilute sulphuric acid derived from the precipitating system. To compensate for losses in the system, additional sulphuric acid (for example, in the form of 65° Bé. sulphuric acid) is introduced in appropriate amount into the barium sulphide-sulphuric acid reaction tank.

In the modification of the invention illustrated in Fig. 2 of the drawings, the dilute sulphuric acid from the zinc sulphide precipitating system is mixed in the reaction tank with a slurry of black ash resulting from the reduction of barium sulphate with carbon at an elevated temperature. This slurry is taken directly from the leaching tank, wherein the reduction product discharged from the reduction kiln is pulped up in water. The reduction kiln is charged with a mixture of coal, barytes and barium sulphate prepared in an appropriate mixer. The barytes is added to the mixer to compensate for losses in the system. The bulk of the barium sulphate added to the mixer is the barium sulphate produced in the reaction tank by the reaction of barium sulphide with dilute sulphuric acid. This barium sulphate is prepared for treatment in the reduction kiln as follows:

The reaction tank discharges a slurry of barium sulphate in water, accompanied by the residual material present in the black ash (such as ash from the coal, unconsumed carbon and gangue material) into a thickener, where the excess water is allowed to overflow and discharged to waste. The thickened pulp is transferred to a classifier in which the solid refuse of gangue, ash, coal and the like settles towards the bottom while the pulverulent barium sulphate remains suspended in the supernatant liquor and is removed in the classifier overflow or effluent and transferred to a filter-press. The filter cake from the press is transferred to a dryer, and the dried product is charged to the mixer as hereinbefore described.

It may be advantageous, under certain circumstances, to combine the operations illustrated in Figs. 1 and 2 of the drawings, that is to say to supply both a slurry of black ash and separately prepared barium sulphide liquor to the reaction tank for treatment with dilute sulphuric acid. This may readily be accomplished by shunting a certain proportion of the black ash slurry from the first leaching tank to the reaction tank as indicated by the dotted line in Fig. 1 of the drawings. A portion of the black ash slurry in the first leaching tank may thus be transferred to the reaction tank, whereby the reaction tank is supplied both with black ash slurry and with barium sulphide liquor. Operating in this manner, part of the residue accompanying the barium sulphate precipitate circulates through the system but sufficient residue is removed from the discharge of the last washing tank to prevent undue building up of residue in the system.

The present invention may be advantageously practiced in combination with the method of manufacturing zinc sulphide disclosed in the co-pending United States patent application Serial No. 538,611, filed May 19, 1931 by Leon S. Holstein and George F. A. Stutz. This application discloses a method of producing zinc sulphide by the reaction of hydrogen sulphide and zinc sulphate solution, in which both the zinc sulphate and the hydrogen sulphide are obtained by treating zinc blend with sulphuric acid. Dilute zinc sulphate solution is prepared from the zinc sulphate produced in this reaction and this dilute zinc sulphate solution is then brought into reaction with the hydrogen sulphide gas. This method involves the discharge to waste of the dilute sulphuric acid formed in the reaction of the zinc sulphate solution with the hydrogen sulphide gas. Moreover, in commercial practice, more zinc sulphate is produced than corresponds to the hydrogen sulphide actually produced. While theoretically equivalent amounts of zinc sulphate and hydrogen sulphide are obtained by the treatment of zinc blend with sulphuric acid, substantial amounts of hydrogen sulphide are inevitably lost in the operation, in part on account of the secondary reactions of hydrogen sulphide with sulphuric acid with consequent formation of elemental sulphur. Moreover, excess sulphuric acid must be used in the treatment of zinc blend in order to obtain complete transformation of the zinc sulphide present in the blend to zinc sulphate. In consequence, the dilute zinc sulphate solution prepared by leaching the product of the reaction contains a substantial amount of free sulphuric acid. It is expedient in practice to neutralize this free sulphuric acid with zinc oxide in the form of roasted blend or refuse zinc oxide. This neutralization step introduces zinc sulphate into the solution in excess of that corresponding to the hydrogen sulphide produced in the original reaction of sulphuric acid with blend. In consequence, insufficient hydrogen sulphide is ordinarily available in the method of application Serial No. 538,611 to react with the zinc sulphate to produce zinc sulphide.

By the method of the present invention, the dilute sulphuric acid discharged from the precipitation reaction of hydrogen sulphide with zinc sulphate solution is brought into reaction with barium sulphide in order to prepare sufficient hydrogen sulphide to transform the excess zinc sulphate obtained in the aforementioned digestion and neutralization operation to zinc sulphide. In this manner, such additional amounts of hydrogen sulphide as may be required are conveniently and economically produced.

The following example illustrates an actual practice of the invention:

The apparatus of Fig. 1 was operated for the production of zinc sulphide pigment at the rate of 5 net tons of pigment (containing 99% ZnS) per day of 24 hours. The recovery of sulphur in the form of zinc sulphide from $H_2S$ in the reaction $ZnSO_4 + H_2S = ZnS + H_2SO_4$ was 95%. The recovery of zinc from $ZnSO_4$ in the form of ZnS in the reaction $ZnSO_4 + H_2S = ZnS + H_2SO_4$ was 97.5%. The recovery of sulphuric acid (that is to say $SO_4$ from $ZnSO_4$ in the foregoing reaction) was 96.5%. The recovery of sulphur from $Ba(OH)(SH)$ in the form of $H_2S$ in the reaction $Ba(OH)(SH) + H_2SO_4 = BaSO_4 + H_2S + H_2O$ was 93.2%. The recovery of barium in the form of barium sulphide in the reaction $BaSO_4 + 2C = BaS + 2CO_2$ was 93%. The barium in the form of $Ba(OH)(SH)$ from BaS in the reaction $BaS + H_2O = Ba(OH)(SH)$ was 95%.

The losses in the system due to the lack of quantitative recovery are compensated for by the addition of barytes to the mixture of precipitated barium sulphate and coal (which compensates for the loss of barium and sulphur) and by the addition of sulphuric acid in the form of concentrated sulphuric acid to the barium sulphide-sulphuric acid reaction tank (which compensates for the loss of sulphuric acid).

The efficiencies of recovery when practicing the invention in accordance with the flow sheet of Fig. 2 are substantially the same as stated in the foregoing example.

I claim:

1. In the manufacture of zinc sulphide pigment, the steps which comprise precipitating zinc sulphide by the reaction of hydrogen sulphide with an aqueous solution of zinc sulphate with the formation of dilute sulphuric acid and producing hydrogen sulphide for said reaction by the reaction of said dilute sulphuric acid with barium sulphide.

2. In the manufacture of zinc sulphide pigment, the steps which comprise precipitating zinc sulphide by the reaction of hydrogen sulphide with an aqueous solution of zinc sulphate with the formation of dilute sulphuric acid, producing hydrogen sulphide for said reaction by mixing said dilute sulphuric acid with barium sulphide liquor and thereby forming said hydrogen sulphide and a precipitate of barium sulphate, and regenerating barium sulphide by reduction of said barium sulphate precipitate with carbon at an elevated temperature.

3. In the manufacture of zinc sulphide pigment, by the steps which comprise precipitating zinc sulphide by the reaction of hydrogen sulphide with an aqueous solution of zinc sulphate with the formation of dilute sulphuric acid, producing hydrogen sulphide for said reaction and a precipitate of barium sulphate by mixing said dilute sulphuric acid with barium sulphide, and utilizing said barium sulphate precipitate to regenerate barium sulphide.

4. In the manufacture of zinc sulphide pigment, the cycle of steps which comprises precipitating zinc sulphide by the reaction of hydrogen sulphide with an aqueous solution of zinc sulphate with the formation of dilute sulphuric acid, producing hydrogen sulphide for said reaction by mixing said dilute sulphuric acid with barium sulphide liquor and thereby forming hydrogen sulphide and a precipitate of barium sulphate, separating said barium sulphate precipitate from the accompanying liquor, reducing the separated barium sulphate precipitate to barium sulphide with carbon and heat, and treating the resulting reduction product with water to regenerate barium sulphide liquor.

5. In the manufacture of zinc sulphide pigment, the cycle of steps which comprises precipitating zinc sulphide by the reaction of hydrogen sulphide with an aqueous solution of zinc sulphate with the formation of dilute sulphuric acid, producing hydrogen sulphide for said reaction by mixing said dilute sulphuric acid with barium sulphide liquor and thereby forming hydrogen sulphide and a precipitate of barium sulphate, separating said barium sulphate precipitate from the accompanying liquor, reducing the separated barium sulphate precipitate to barium sulphide with carbon and heat, treating the resulting reduction product with water to dissolve barium sulphide, separating the resulting barium sulphide liquor from the accompanying solid matter, and mixing the separated barium sulphide liquor with further amounts of said dilute sulphuric acid for the production of further amounts of hydrogen sulphide.

6. In the manufacture of zinc sulphide pigment, the cycle of steps which comprises precipitating zinc sulphide by the reaction of hydrogen sulphide with an aqueous solution of zinc sulphate with the formation of dilute sulphuric acid, producing hydrogen sulphide for said reaction by mixing said dilute sulphuric acid with barium sulphide and thereby forming hydrogen sulphide and a precipitate of barium sulphate, separating said barium sulphate precipitate from the accompanying liquor and extraneous solid matter, reducing the separated barium sulphate precipitate to barium sulphide with carbon and heat, treating the resulting reduction product with water to dissolve barium sulphide, and mixing the resulting barium sulphide liquor and accompanying solid matter with further amounts of said dilute sulphuric acid for the production of further amounts of hydrogen sulphide.

7. In the manufacture of zinc sulphide pigment, the cycle of steps which comprises precipitating zinc sulphide by the reaction of hydrogen sulphide with an aqueous solution of zinc sulphate with the formation of dilute sulphuric acid, producing hydrogen sulphide for said reaction by mixing said dilute sulphuric acid with an aqueous pulp of black ash resulting from the reduction of barium sulphate with carbon and heat and thereby forming hydrogen sulphide and a precipitate of barium sulphate, separating said barium sulphate precipitate from the accompanying liquor and extraneous solid matter, reducing the separated barium sulphate precipitate to barium sulphide with carbon and heat, and treating the resulting reduction product with water to form a pulp of black ash for mixing with further amounts of said dilute sulphuric acid.

EDMUND J. FLYNN.

CERTIFICATE OF CORRECTION.

Patent No. 2,049,646.

August 4, 1936.

EDMUND J. FLYNN.

It is hereby certified that error appears in the printed specification of the above numbered patent requiring correction as follows: Page 1, second column, line 14, strike out the article "the" first occurrence; page 2, first column, line 60, for "65°" read 66° and same page, second column, line 61, strike out the word "of"; and that the said Letters Patent should be read with these corrections therein that the same may conform to the record of the case in the Patent Office.

Signed and sealed this 22nd day of September, A. D. 1936.

Henry Van Arsdale
Acting Commissioner of Patents.

(Seal)

CERTIFICATE OF CORRECTION.

Patent No. 2,049,646.

August 4, 1936.

EDMUND J. FLYNN.

It is hereby certified that error appears in the printed specification of the above numbered patent requiring correction as follows: Page 1, second column, line 14, strike out the article "the" first occurrence; page 2, first column, line 60, for "65°" read 66°; and same page, second column, line 61, strike out the word "of"; page 3, first column, line 45, before "barium" insert the words recovery of; and same page, second column, line 8, claim 3, strike out "by"; and that the said Letters Patent should be read with these corrections therein that the same may conform to the record of the case in the Patent Office.

This Certificate supersedes Certificate of Correction issued September 22, 1936.

Signed and sealed this 20th day of October, A. D. 1936.

(Seal)

Leslie Frazer
Acting Commissioner of Patents.